United States Patent
Perciballi

(10) Patent No.: US 9,630,550 B1
(45) Date of Patent: Apr. 25, 2017

(54) ENERGY ATTENUATING CONTAINER MOUNTING SYSTEM

(71) Applicant: Armorworks Holdings, Inc., Chandler, AZ (US)

(72) Inventor: William J. Perciballi, Phoenix, AZ (US)

(73) Assignee: Armorworks Holdings, Inc., Chandler, AZ (US)

(*) Notice: Subject to any disclaimer, the term of this patent is extended or adjusted under 35 U.S.C. 154(b) by 0 days.

(21) Appl. No.: 15/070,824

(22) Filed: Mar. 15, 2016

Related U.S. Application Data

(63) Continuation-in-part of application No. 15/057,255, filed on Mar. 1, 2016, now Pat. No. 9,428,098.

(51) Int. Cl.
*B60P 7/08* (2006.01)
*B60P 7/18* (2006.01)
*B60P 7/13* (2006.01)

(52) U.S. Cl.
CPC .. *B60P 7/18* (2013.01); *B60P 7/13* (2013.01)

(58) Field of Classification Search
CPC .................................... B60P 7/18; B60P 7/13
USPC .................. 410/77, 80, 81, 86, 87, 94, 121; 188/371, 377; 267/161, 160, 140.13, 289, 267/291
See application file for complete search history.

(56) References Cited

U.S. PATENT DOCUMENTS

| | | | |
|---|---|---|---|
| 3,586,131 A | 6/1971 | Le Mire | |
| 3,738,302 A | 6/1973 | Flajole | |
| 3,908,951 A | 9/1975 | Goben | |
| 3,963,099 A | 6/1976 | Skinner et al. | |
| 4,078,636 A * | 3/1978 | Yamanaka | B60G 99/002 180/271 |
| 4,241,810 A | 12/1980 | Newlon | |
| 4,509,621 A | 4/1985 | Desjardins et al. | |
| 5,813,649 A | 9/1998 | Peterson et al. | |
| 6,280,127 B1 | 8/2001 | Spilker et al. | |
| 7,891,922 B2 * | 2/2011 | Fukuda | B60P 7/18 410/46 |
| 7,938,485 B1 | 5/2011 | Perciballi et al. | |
| D657,312 S | 4/2012 | Aragon et al. | |

(Continued)

OTHER PUBLICATIONS

Internet document at web address: http://www.warren.af.mil/library/factsheets/factsheet.asp?id=4461. Title: U.S. Air Force Fact Sheet Payload Transporter. Posted Mar. 3, 2012.

*Primary Examiner* — Stephen Gordon
(74) *Attorney, Agent, or Firm* — James L Farmer

(57) ABSTRACT

Methods and apparatus are provided for an energy attenuating mounting system configured for attaching a container to a vehicle bed at a plurality of discrete mounting points around the container. The mounting system may include a bracket attached to the container at each mounting point, and a plastically deformable energy attenuating member extending from an upper end attached to the bracket, to a lower end attached to the vehicle bed substantially below a bottom of the container, thereby supporting the container in an elevated position. The energy attenuating member is configured to remain rigid and un-deformed if a load carried by the energy attenuating member is below a threshold value, and to attenuate energy by plastically deforming in a predictable manner if the load exceeds the threshold value.

3 Claims, 9 Drawing Sheets

(56) References Cited

U.S. PATENT DOCUMENTS

| | | |
|---|---|---|
| 8,550,553 B1 | 10/2013 | Clark et al. |
| 8,678,465 B1 | 3/2014 | Aragon et al. |
| 8,731,129 B2 | 5/2014 | Tamaki et al. |
| 8,876,094 B1 | 11/2014 | Ridgeway et al. |
| 9,272,657 B1 * | 3/2016 | Perciballi ............ B60P 7/18 410/86 |
| 9,428,098 B1 * | 8/2016 | Perciballi ............ B60P 7/18 410/86 |
| 2009/0000526 A1 | 1/2009 | Looker |

* cited by examiner

ENERGY ATTENUATING CONTAINER MOUNTING SYSTEM

TECHNICAL FIELD

This Application is a Continuation-in-Part of U.S. Utility application Ser. No. 15/057,255, which is a Divisional of U.S. Utility application Ser. No. 14/710,502, now issued U.S. Pat. No. 9,272,657.

The technical field of the present invention relates to transportation of goods. The technical field may further relate to means for securely attaching a large container to a vehicle bed or trailer for ground transportation.

DESCRIPTION OF THE EMBODIMENTS

Figure 1:
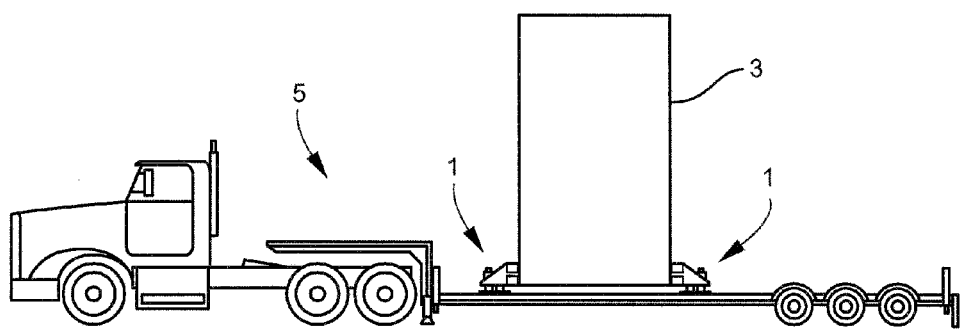
FIG. 1 is an elevation of a container mounted on a truck trailer using the present multi-stage inversion tube mounting system at the corners of the container.

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Referring now to the drawing Figures, an exemplary multi-stage energy attenuating mounting system in accordance with the present disclosure is indicated generally at reference numeral 1. The mounting system 1 is uniquely adapted for securely attaching and retaining a container to a vehicle or trailer (such as e.g. the trailer of a tractor-trailer transportation system, or "semi-truck and trailer") for ground transport. In one exemplary embodiment shown in FIG. 1, a box-shaped container 3 is attached to a flat bed semi-truck trailer 5 using the mounting system 1 at the bottom corners of the container. The mounting system comprises generally a spring element that acts to absorb shock during normal operation or driving, and one or two deformable elements that attenuate energy associated with a high energy loading event through controlled plastic deformation, where the spring element and deformable elements are arranged serially with respect to one another.

As will be described in greater detail below, the mounting system 1 is particularly useful for situations involving transportation of a container that must stay attached to the vehicle during transport under all circumstances. The ability to positively retain a payload may in some cases be required by applicable regulations or laws, for example when transporting certain hazardous or dangerous materials. Depending on the type of material and associated risk, the type of container required for transport may also be specified. For example, regulations may require the use of a heavy, sealed container or vault for transporting certain highly dangerous or toxic materials. The present inventors have discovered that when rigid means such as welding or bolting are used for attaching such heavy containers to a vehicle, the attachments are prone to fail, particularly when subjected to a severe shock load such as may result from a vehicle crash, or an explosive blast occurring nearby or underneath the vehicle or container. The mounting system 1 of the present disclosure addresses this concern by providing a unique, staged, energy attenuating mechanism for substantially reducing the peak load imparted to the container and container attachments during such events.

Referring now to FIGS. 2 through 5, a mounting bracket 7 provides an attachment means for securing the mounting system to a container (or any consolidated payload), and for transferring load from the container into the active elements of the mounting system. In the depicted embodiment the bracket 7 is in the form of an angle bracket, with a horizontal flange 8 reinforced by angle gussets 9. The bracket 7 may be bolted to the container as shown, or alternatively it may be formed as an integrated part of the container or payload, such as by welding.

For convenience, the mounting system will be described as if oriented in the manner shown in FIG. 1, in which the flange 8 is in a horizontal orientation, or generally parallel to the ground, and the active elements of the system (described below) are oriented to attenuate vertically directed loads. However the use of such orientation terms is not intended to be limiting, and in fact the mounting system may be effectively utilized in any orientation as may be needed to accommodate non-vertical loading conditions.

Figure 2:
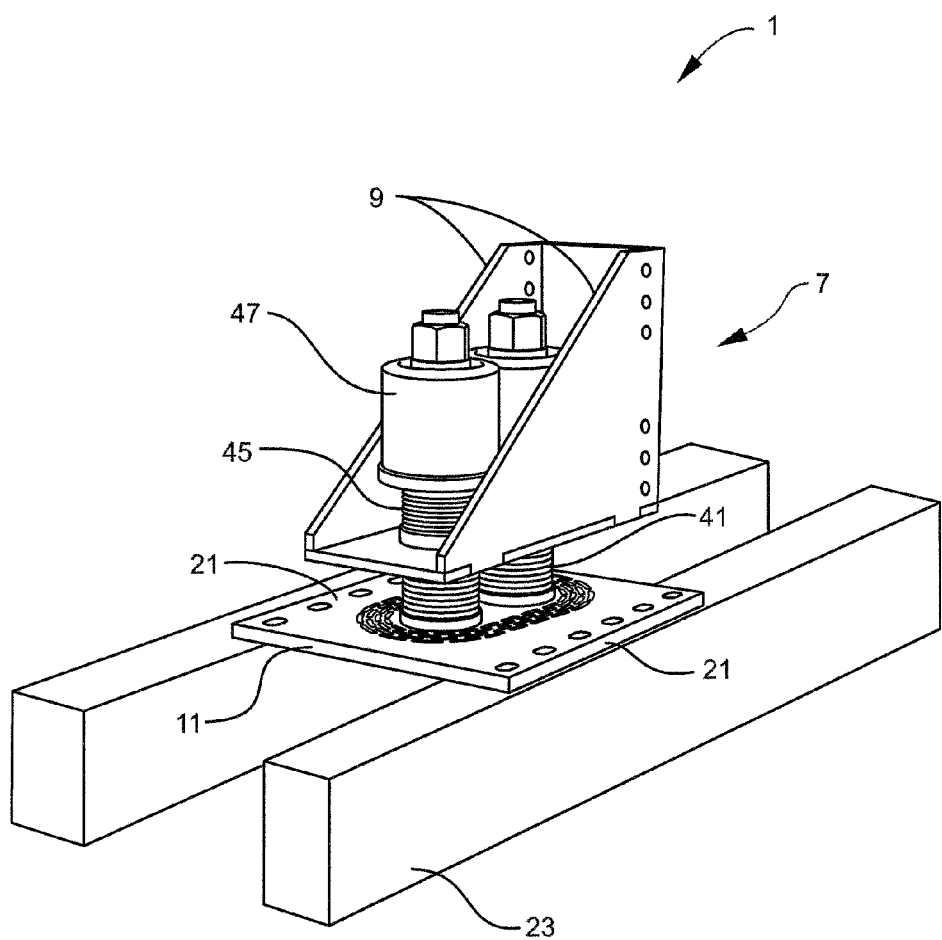
FIG. 2 is a perspective view of an exemplary mounting system attached to parallel vehicle frame members.

The bracket 7 is attached to a perforated base plate 11 via a pair of threaded rods 13 fitted with an arrangement of compliant and attenuating elements. A perimeter portion of the perforated base plate 11 is adapted for being rigidly attached to a vehicle, such as by bolting through the holes 19 distributed along the side edges 21 of the plate (See FIG. 5). When correctly installed the plate 11 is supported at the perimeter only, leaving open space under the center portion of the plate, as shown in FIG. 2 for example where the edges 21 are supported by vehicle frame members 23. Alternatively the plate 11 could simply be mounted over a properly sized hole in the vehicle floor, or atop stand-offs such as two parallel beam segments, so long as sufficient space is provided under the plate to allow for the plate to deform downward by a desired amount without another portion of the system, such as the brackets 7 or the container itself, contacting the vehicle first and stopping the downward motion.

Figure 3:
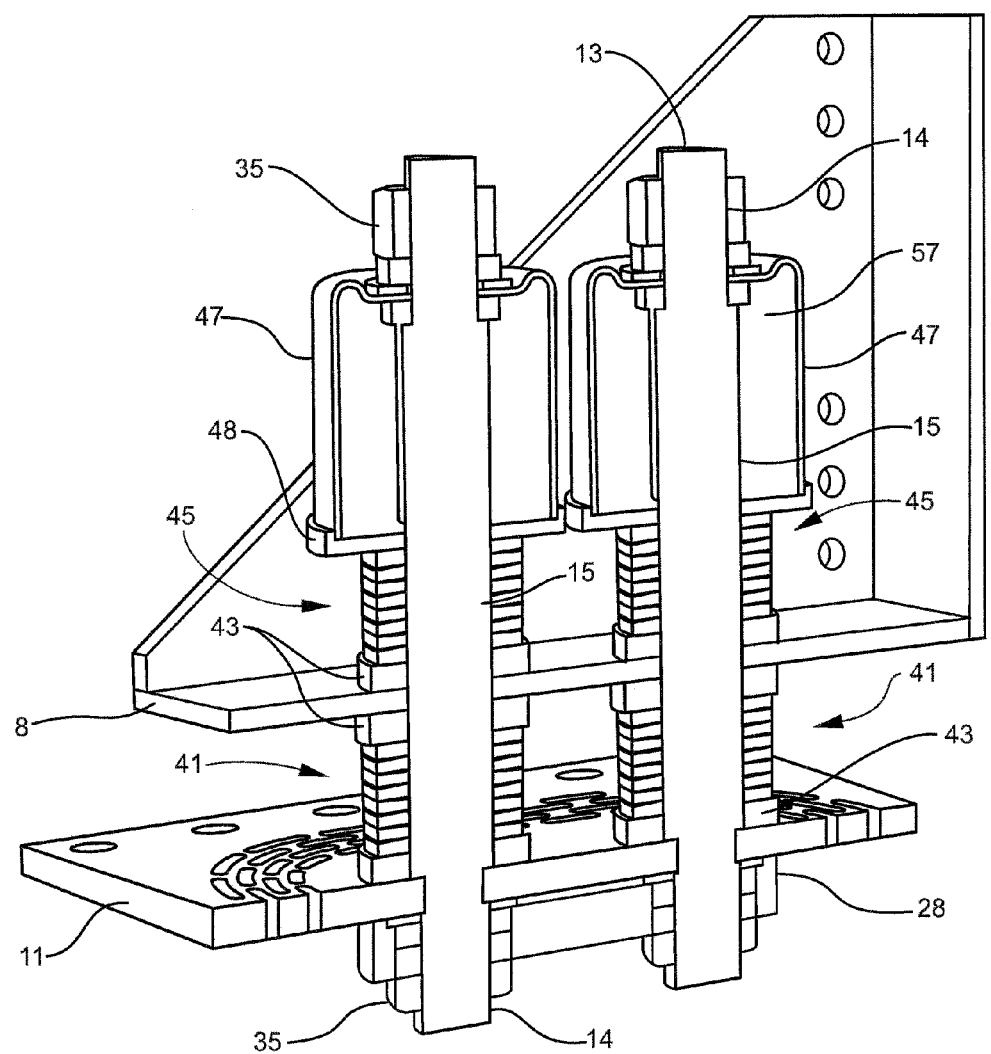
FIG. 3 is a cross-section of the mounting system of FIG. 2.
Figure 4:
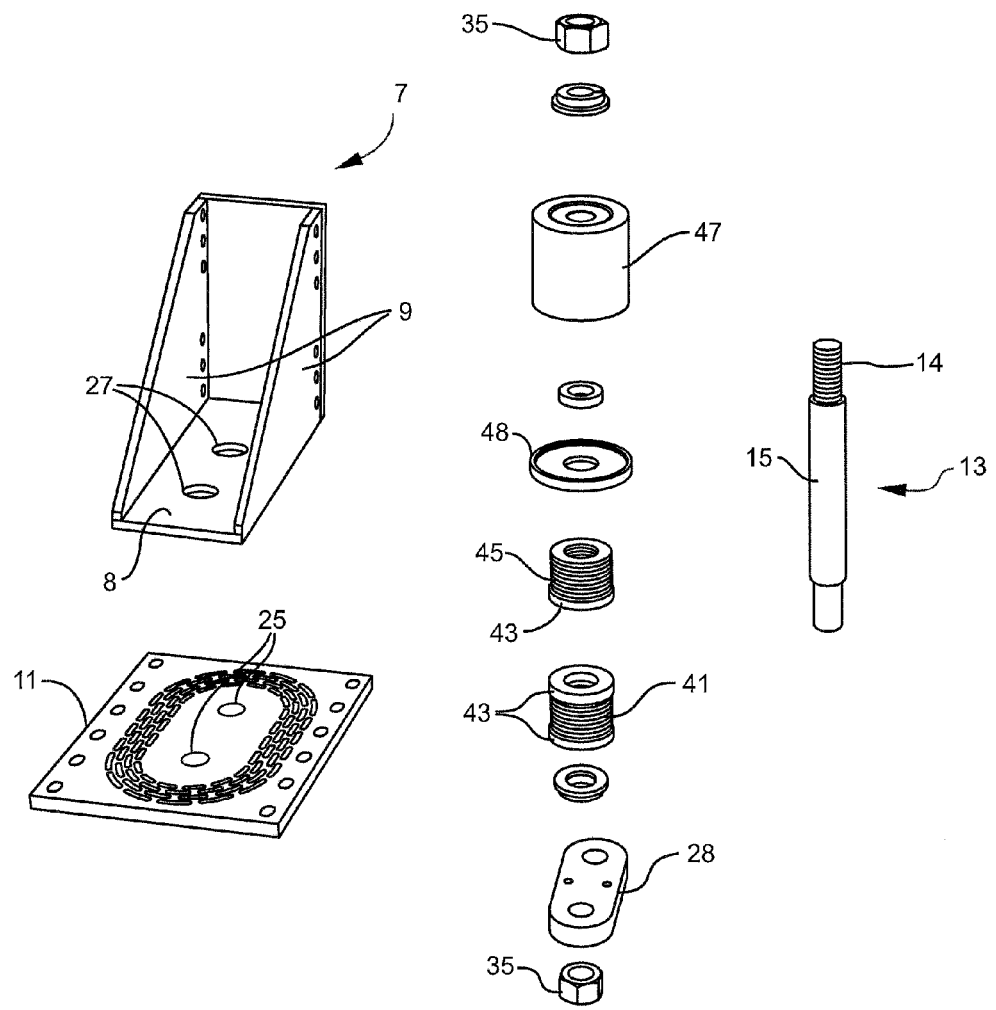
FIG. 4 is an exploded view of the mounting system of FIG. 2.

The threaded rods 13 extend through a pair of spaced apart holes 25 in the perforated plate 11 and a juxtaposed pair of holes 27 in the horizontal flange 8 of bracket 7. As best seen in FIGS. 3 and 4, the ends of rod 13 may be configured in the manner of a shoulder bolt, with threaded ends 14, and a larger diameter unthreaded middle portion 15. In that case the holes 25 in the perforated plate are large enough to allow the threaded end 14 of rod 13 to pass through, but not the larger diameter, unthreaded middle portion 15. The holes 27 in flange 8 are slightly larger than the unthreaded middle portion 15 however, such that the rods may slide in flange 8 without interference. The lower ends 14 of rods 13 may be used to firmly attach the rods using a nut 35 on a portion of the threaded end protruding below the plate. Alternatively the rods could be integrated with the plate, such as by welding.

The assembly may also include a thick, elongated, load-spreading washer 28 that goes between the nut 35 and the bottom of plate 11. The load-spreading washer 28 serves to ensure that nuts 35 are not pulled through the plate 11 when the rods 13 are being pulled upward by brackets 7 under any anticipated loading conditions. Although shown as a separate part held in place by nut 35, washer 28 may also be an integrally formed part of plate 11, or solidly attached to the bottom of plate 11 such as by welding or brazing.

Figure 5:
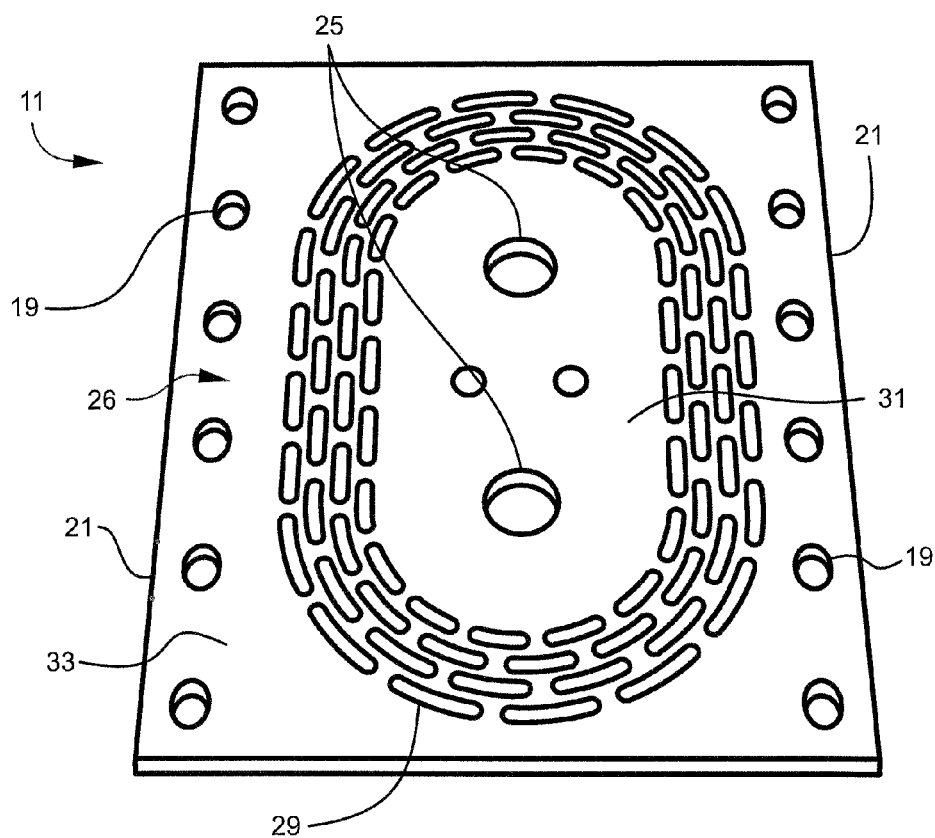
FIG. 5 is a perspective view of a perforated base plate component of the mounting system of FIG. 2.
Figure 6:
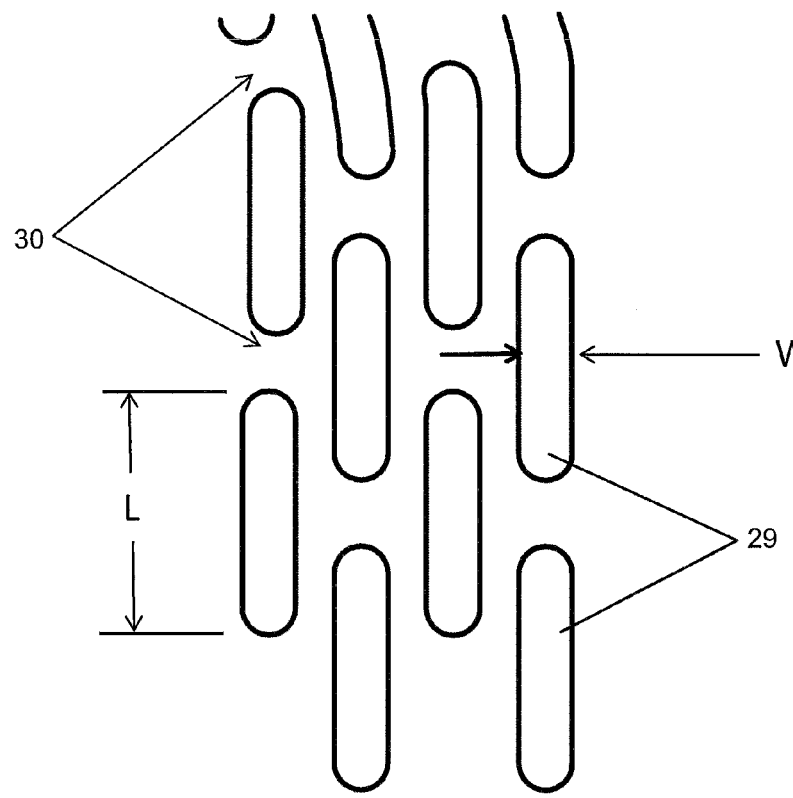
FIG. 6 is a close-up perspective view of a portion of the perforated region of the perforated base plate shown in FIG. 5.

Referring now to FIGS. 5 and 6, a perforated region 26 comprising a series of slots 29 arranged in multiple concentric rings surrounds the holes 25 in plate 11. The rings are in a racetrack shape, forming concentric circular arcs of slots at the ends around the bolt holes 25, and becoming straight, parallel rows in a middle portion between the bolt holes. Inside and outside of the perforated region 26, the plate 11 is solid, whereby the innermost racetrack shaped ring of slots defines the outer edge of an un-perforated center portion 31 of the plate, and the outermost ring of slots defines an inner edge of an un-perforated outer portion 33 of the plate.

Each slot 29 may have an elongated shape as shown, with a length L and a width W, wherein the slots in each ring (or row) are separated from each other by solid sections of plate 30. In the depicted embodiment the widths W are all the same, while the lengths L vary around the pattern. The spacing between slots, also describable as the length of solid sections of plate 30, may similarly be uniform or variable. In one embodiment the spacing between pairs of slots in a ring is more than the width W and less than the length L of the adjacent slots. In another embodiment the spacing between pairs of slots in a ring is uniform and approximately equal to the width W of the slots. The slots are also offset from row to row, such that a slot in one row is adjacent a solid section of plate between slots in the rows on either side. The spacing between adjacent pairs of rings is enough to prevent the slots of adjacent rings from touching, and in one embodiment the ring-to-ring (or row-to-row) spacing approximately matches the width W of the slots.

This arrangement of concentric rings of offset slots operates to provide a means for providing a relatively large amount of controlled out-of-plane deflection of the center portion 31 of the plate relative to the outer portion 33 and edges 21. When properly configured, the perforated region 26 begins to yield and deform when center portion 31 is subjected to a vertical load that exceeds a threshold value. Deformation occurs as the individual solid sections of plate between neighboring slots stretch and bend in the manner of expanded metal. Through proper sizing and spacing of the slots, and proper material selection, relatively large vertical deflections of the center portion 31 of the plate 11 may be obtained without rupture. Testing has shown that deflections on the order of several times the thickness of the perforated plate are possible without rupturing the plate or tearing free the center portion.

Figure 7:
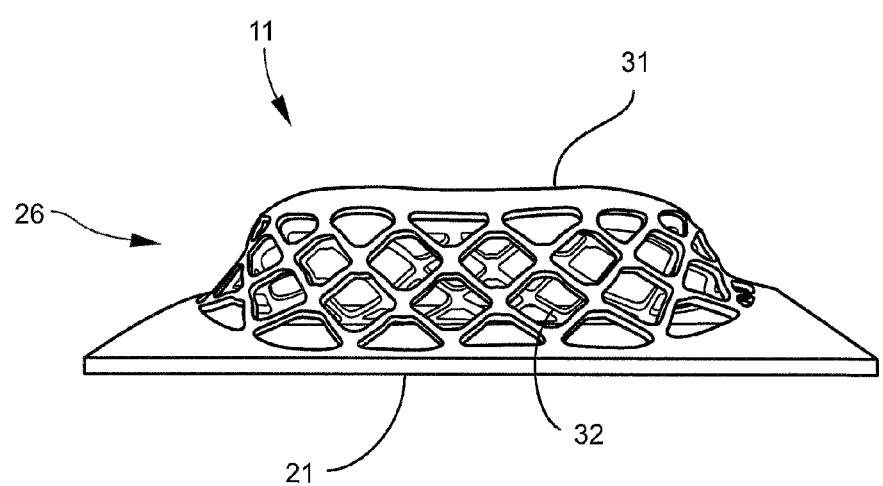
FIGS. 7 and 8 are side and end views of a plastically deformed perforated base plate.
Figure 8:
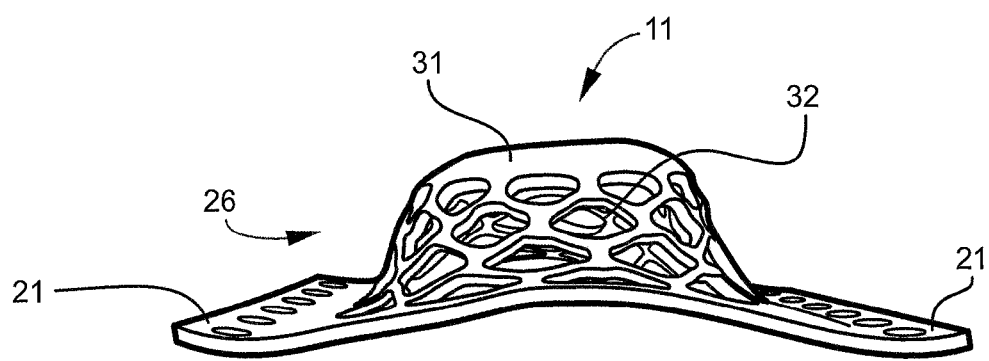

FIGS. 7 and 8 depict the result of one such test. A 0.25 in. thick stainless steel perforated plate 11 in accordance with the present disclosure was installed in a vertical press, with the edges 21 supported on fixed rails. A load cell was positioned above the plate 11 and configured to apply an evenly distributed downward load on the center portion 31. The downward load applied in the test was sufficient to substantially exceed a deformation threshold value of the plate, causing a large amount of plastic deformation of the perforated region 26 on the order of many times the thickness of the plate. The resulting deformation stretched the slots 29 into a pattern of diamond shaped openings 32 commonly associated with expanded metal. As will be discussed further below, the perforated plate 11 thus provides one stage of the multi-stage energy attenuation capability of the mount system 1.

Referring again to FIGS. 2 through 4, rods 13 extend up from plate 11 and through the clear holes 27 of flange 8, with flange 8 spaced apart from plate 11 and positioned about the un-threaded middle portion 15 of rods 13. A lower compression spring 41 is disposed about each rod 13 between the flange 8 and plate 11, with centering caps 43 at each end of the spring. The spring 41 may be a single coil spring, or alternatively a stack of Bellville washers. On the other (upper) side of flange 8 a similar or identical compression spring 45 is disposed about rod 13 between flange 8 and a drive washer 48 that supports an inversion tube 47, also disposed about rod 13. Another nut 35 clamps an upper end 56 of inversion tube 47 down against a shoulder on the upper ends of rods 13, while also applying a degree of precompression to springs 41 and 45. As can be seen, the flange 8 of bracket 7 is thus trapped between pairs of springs 41 and 45, and in order for flange 8 to move up or down relative to perforated plate 11, it must compress either the springs 45 above the flange, or springs 41 below.

Figure 9:
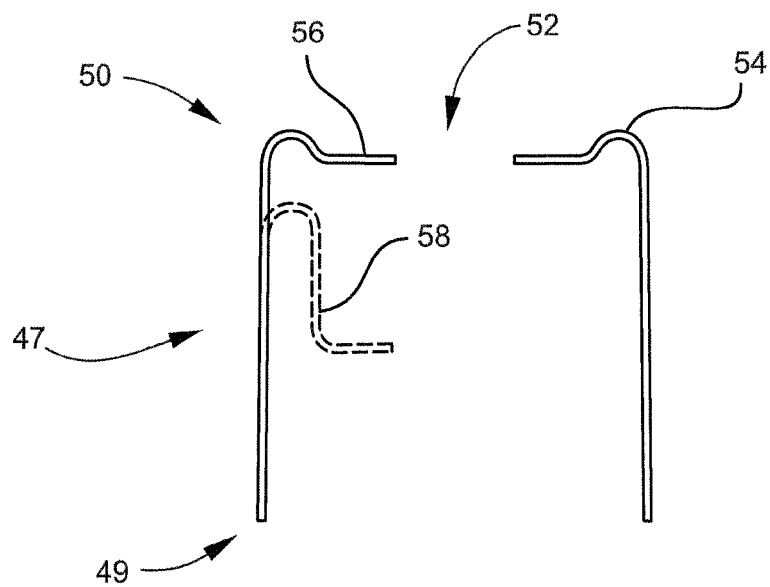
FIG. 9 is a cross-section of an inversion tube component of the mounting system of FIG. 2.

Referring to FIG. 9, the inversion tube 47 is essentially a cylindrical length of metal tubing that is open at the lower end 49 and substantially closed at the upper end 50, with the exception of a hole 52 to receive the threaded end of rod 13. An upper corner 54 of the inversion tube has a rounded shape that forms a curved, or arcuate, transition to a recessed, flat center portion 56 of the upper end. Center portion 56 is securely clamped against the upper shoulder of rod 13 by the nut 35, thereby securely attaching the inversion tube to rod 13. The diameter of the inversion tube is substantially greater than the diameter of rod 13, defining a large annular gap 57 between the inside of the tube and outside of the rod.

Under static conditions, the weight of a container supported by a mounting system 1 applies a downward load to the system via bracket 7. Because flange 8 is free to slide along the rods 13, a downward load from a container is transmitted directly from flange 8 to lower springs 41. From there the load is transferred by the springs to the center section 31 of perforated plate 11, across the perforated region 26, and finally reacted by the vehicle structure (or by intermediary supporting beams) at the outer edges 21.

The springs 41 are preferably sized to operate in a similar manner to automobile suspension springs, supporting the static weight of a container in this case, with minimal or no deflection, and only deflecting under greater than static (or 1 g) loads such as may occur when the vehicle hits a bump in the road. One way of accomplishing this is by pre-compressing the springs at assembly to a load level in excess of the static load. For example in one embodiment the springs are pre-compressed to a load corresponding to 1.5 g's for a particular installation. Also like automobile springs, the springs of the present invention are preferably configured so as not to bottom out during normal operating conditions, and normal amounts of up and down acceleration. The amount of load required to fully compress and bottom the springs is intended to be significantly higher, and may be conveniently expressed as some multiple of the static load applied by a container, such as two or three times the 1.0 g static load. For example in one embodiment, taking into account the number of mounts supporting a particular container, the springs are sized to have an operational range of between 1.5 and 3.0 g. In other words, the springs are sized to only begin deflecting when the load exceeds 1.5 g, and to be fully bottomed out when the load reaches three 3.0 g.

The upper springs 45 are also sized to compress under normally anticipated loading conditions. Springs 45 are trapped between the top surface of flange 8 and the lower end of the inversion tube 47, and any upward motion of the container relative to the vehicle is resisted sequentially by springs 45, the inversion tube 47, the rods 13, and plate 11. Upward motion of some or all mounts may occur for example as a result of a sudden vertical acceleration, such as from an explosion occurring under the container, or from a sudden horizontal acceleration causing an overturning moment resulting, such as from a vehicle collision. Like springs 41, the operational range of springs 45 may be expressed as a range of g's, although because there is no static loading, the lower end of the operational range may be less than 1.0 g if desired. For example, in one embodiment the upper springs have an operational range of between 0.0 g and 3.0 g, although it should be appreciated that pre-loading the springs will result in the same starting load for upper and lower springs.

When vertical mount loading exceeds the operational range of springs 41 or 45, the additional load is reacted, and in some cases attenuated, by other elements of the mounting system. In the case of a downward load, once the springs 41 have bottomed out, any additional downward deflection must come from deformation of plate 11 via deflection of the center portion 31 of plate 11 relative to the supported edges 21. The plate 11 is configured such that substantially no permanent deformation may occur until the vertical load equals or exceeds a value sufficient to bottom out the springs. For example, in the above mentioned embodiment in which the springs have an operational range between 1.5 and 3.0 g, the perforated plate may have a deformation threshold value of about 5.0 g. Once the downward vertical load exceeds the threshold value, the perforated region 26 of the plate will begin to stretch and permanently deform, thereby attenuating, or dissipating, the applied load, and reducing the peak load value experienced by the mounting system. Deformation will proceed until the energy of the loading event is fully exhausted, or until downward motion of the supported container is stopped due to some other portion of the systems such as the container or the brackets 7 bottoming out against the vehicle. When properly configured, the plate 11 will plastically deform but not rupture, even in a worst case loading event.

In some installations it may be desirable to in fact rely on the container or the brackets coming into contact with the vehicle to arrest the downward motion. For example, it may be desirable to stop the downward motion before the springs 41 are fully bottomed out, or alternatively after some pre-defined amount of downward deformation of plate 11. In either case, the installation may be configured with an initial gap between the bottom of the container (or flanges 7) and the vehicle structure or floor that allows for only the desired amount of downward motion to occur.

In the case of an upward load, once the springs 45 have bottomed out, the system is configured such that any additional upward deflection must come initially from deflection of inversion tube 47. The inversion tube is configured such that substantially no permanent deformation may occur until the vertical load reaches a pre-defined threshold value that equals or exceeds the load required to bottom out the upper springs. Once the upward vertical load reaches the threshold value, the inversion tube will begin to deform and invert at the upper corner 54 as it is pushed upward from the lower end by drive washer 48, causing the fixed center section 56 to be pulled inside the tube. The dashed lines in FIG. 9 illustrate a partially inverted condition in which the upper end has been pulled closer to drive washer 48, creating an inverted portion 58 inside the un-deformed portion of the inversion tube in the annular space around rod 13. For example, in one embodiment the inversion tube may be configured such that the onset of deformation occurs at the load required to fully compress springs 45, with the inversion process continuing as long as the load stays at or above the threshold level. The resulting deformation of the inversion tube acts to attenuate, or dissipate, the energy being imparted to the mounting system until all of the energy is absorbed and the deformation stops, or until the drive washer 48 bottoms out against the underside of the fixed upper end of the tube.

If the drive washer 48 does in fact bottom out, and not all of the energy of the loading event has been exhausted, any continuing upward load is then transmitted directly by the rods 13 to the perforated plate 11. If the remaining energy and upward load is sufficient to exceed a threshold value for the perforated region of the plate, such as the previously mentioned 5.0 g threshold, the plate 11 will begin to deform and attenuate the imparted energy. In this case the direction of deformation is reversed from the case of a downward load, with the un-perforated center portion 31 of the plate being pulled upward relative to the fixed outer edges. Plate 11 is thus capable of attenuating loads in two directions, as contrasted with devices such as the inversion tube 47 that inherently function in one direction only.

The energy attenuating mounting system of the present disclosure thus accommodates a loading event in stages, namely two stages for a downward load, and three stages for an upward load. The springs 41 and 45 account for the first stage by elastically reacting to loads imparted to the mounting system under normal operating conditions as the bracket 7 strokes down or up. The springs react with a force that increases with deflection until the reaction force equals the applied force, or until the springs fully bottom out, in either case stopping the motion of the bracket and container. As with any spring mounting system, the springs act to reduce the peak loads experienced by the mount system by providing an increased stroking distance over which the applied load is reacted. Mount deflection in the first stage is elastic, and therefore repeatable without need for replacing the springs. In contrast, as will be described below, second or third stage mount deflection causes permanent deformation, and is thus not repeatable without replacing the deformed component or components.

A second stage begins when the load reaches a pre-defined threshold value that is in excess of the load required to bottom the springs, resulting in a controlled deformation of an energy attenuating element of the system. In the case of a downward load, the second stage begins when the load reaches a pre-defined threshold value associated with the perforated plate 11. In a properly designed mounting system, once deformation of plate 11 starts it will continue until the energy of the loading event has been fully dissipated by the plastic deformation of the plate. In the case of an upward load, the second stage begins at the onset of deformation of the inversion tube, continuing until the energy of the event has been fully attenuated, or until the tube is fully inverted and bottomed against the upper end of rod 13. Unlike the first stage in which the reaction load increases proportionately with the deflection of the springs, the reaction load in the second stage remains substantially constant as long as deformation is progressing. For example, the reaction load may remain at approximately the deformation threshold value throughout deformation of the attenuating element.

With respect to an upwardly directed load, a third stage begins when the upper springs and the inversion tubes are fully bottomed out, and there is still sufficient event energy remaining to produce an upward load that reaches a pre-defined deformation threshold value for the perforated plate 11. Due to symmetry of the plate 11, the threshold value for the third stage with respect to an upward load may be substantially the same as the deformation threshold value of plate 11 with respect to a downward load. In the third stage, the upward deformation of a correctly designed plate 11 will again continue at a substantially constant load until the remaining energy of the loading event has been fully attenuated.

Thus in summary, deflection at each stage is attributable to only one element of the system. For a downward load, deflection in the first stage is due only to compression of the lower springs 41, while in the second stage deflection is purely due to deformation of plate 11. For an upward load, the upper springs 45, inversion tube 47, and lower plate 11 are each solely and independently responsible for mount deflection in stages one, two, and three respectively.

It should be appreciated that loading events that result in the mount system reaching stages two or three as defined above result in at least some degree of permanent plastic deformation of mount system components. In terms of the present invention, loading events of that severity are considered to be outside of a normal operating range, and are typically catastrophic in nature. Such events may occur for example as a result of a vehicle crash, or from an under-vehicle explosion produced by a land mine or similar device. It should be further understood that any mount system components that are permanently deformed from such an event are expected to be no longer suitable for use. In that respect the inversion tube and perforated plate in particular are considered to be replaceable or disposable elements of the mounting system.

Figure 10:
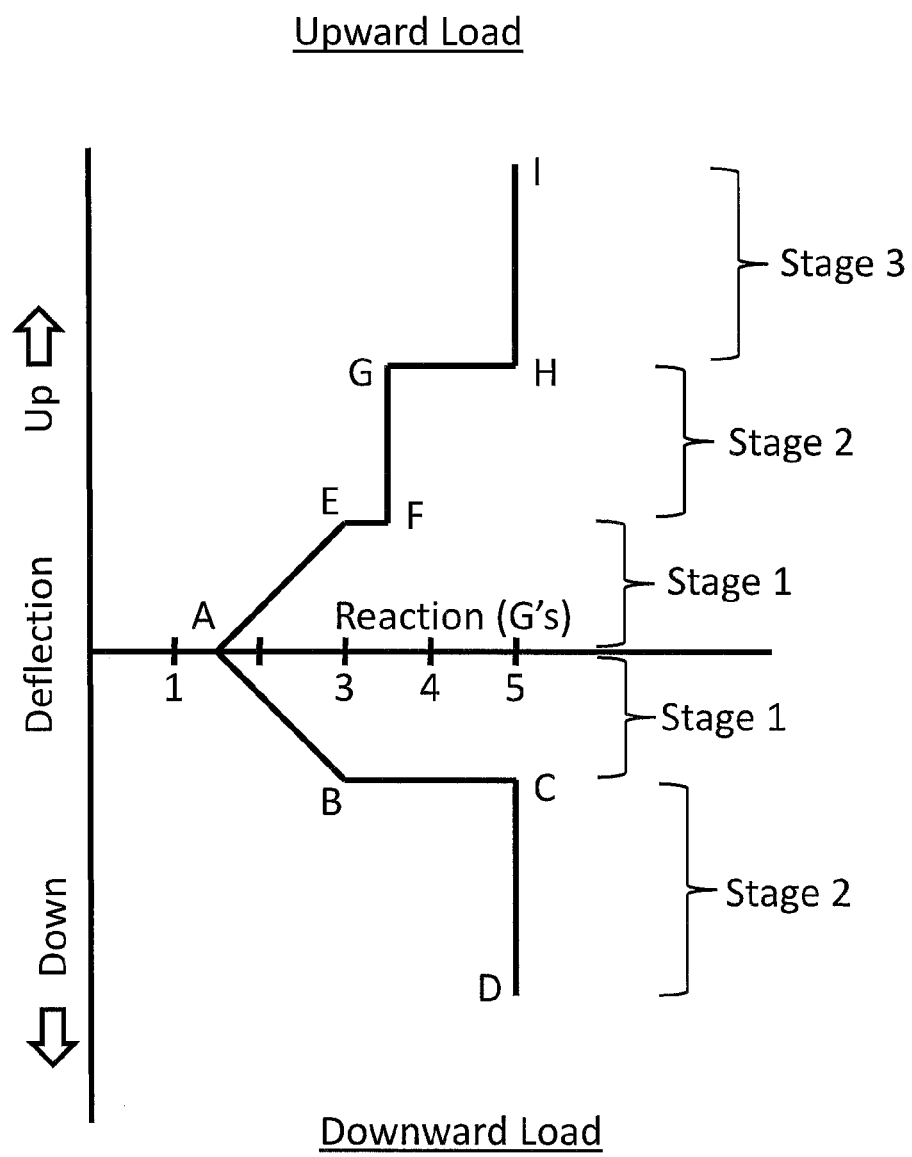
FIG. 10 is a load vs. deflection plot illustrating the sequential behavior of the spring, inversion tube, and deformable base plate portions of the mounting system.

FIG. 10 is a graphical representation of the above described stages, with the reaction load of the mount system on the horizontal axis, and deflection of the bracket 7 on the vertical axis. The mount behavior is shown as a line plot, with the portion above the horizontal axis representing an upwardly directed loading event, and the portion below the horizontal axis representing a downwardly directed load. The numbers shown are generally consistent with previously discussed values and ranges, although provided for purposes of example only, and in no way intended to be limiting.

Starting with the downwardly directed load, no deflection occurs in the first stage until the applied load reaches point A (depicted at 1.5 g), at which time the lower springs 41 begin to compress. Point A may represent the load required to create a measurable deflection of the springs in either a natural or pre-compressed state. The reaction load increases proportionately with the spring deflection until the springs are fully compressed at point B. Point B may also be the deformation threshold load of the perforated plate 11, or the load may increase from point B with no change in deflection as shown in FIG. 10 until reaching the deformation threshold value of the plate at C. Once the threshold is reached, plate 11 starts to deform, and continues deforming at a constant load throughout stage 2 until a point D at which deformation stops, either due to the load dropping below a critical level, or depending on the configuration, due to mechanical interference between the supported container and the vehicle structure.

For an upwardly directed load, first stage deflection and load increase proportionately from Point A until point E, whereupon the upper springs are fully compressed. Point E may also be the deformation threshold load of the inversion tubes, or the load may increase from point E with no change in deflection as shown in FIG. 10 until reaching the deformation threshold value of the inversion tubes at point F. Once the deformation threshold is reached, the inversion tubes start to deform, and continue at a constant load throughout stage 2 until point G at which the tubes are hard against the nuts 35 on the upper ends of rods 13. From there the load again increases without deflection until reaching the deformation threshold value of perforated plate 11 at point H. The plate then starts to deform, and continues at a constant load throughout stage 3 until the load drops below a critical level and deformation stops at point I.

Thus the mounting system provides a staged response to an impulse load in two directions. The springs in the first stage serve to provide an elastic response to normally anticipated up and down accelerations, thereby maintaining loads at a safe level. If the applied load exceeds the spring capacity, the inelastic, deformable elements of the system take over, sequentially deforming to the extent necessary to attenuate the impulse at a constant reaction load, and thus prevent damage or rupture of the mount components or the vehicle structure. In this manner the integrity of the mounting system and vehicle is maintained throughout the loading event, and the container is prevented from becoming detached.

Figure 11:
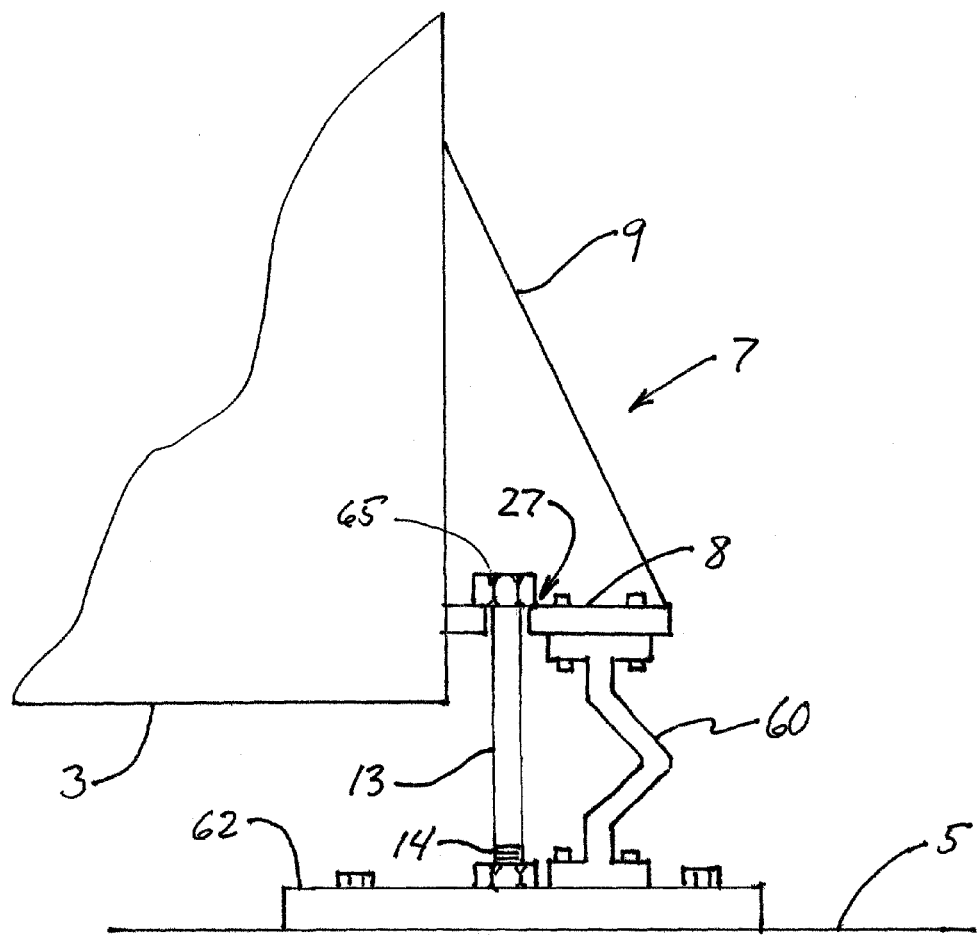
FIG. 11 is a plan view of a corner of a container mounted to a truck bed with the energy attenuating mounting system of the present disclosure.

In yet another embodiment depicted in FIG. 11, a container 3 is securely mounted to a vehicle bed 5 with a series of plastically deformable, or bendable, energy attenuating ("EA") members 60. The mounting system may be configured to support the container in an elevated position as shown to provide space for the container to stroke downward, or toward the vehicle bed. The EA member depicted in FIG. 11 is intended to represent an angled bar type of EA device used in certain crash attenuating seats manufactured and sold by ArmorWorks Enterprises of Chandler, Ariz. The mounting system is not limited to devices of that particular configuration however, and may encompass other types of deformable energy attenuating devices, such as for example the inversion tube and perforated plate devices disclosed herein. Angled bar type devices (also known in the industry as an "EA link") generally comprise a metal bar with straight sections intersecting at corner bends, typically in a letter "V" shape as shown. The bar may have a square cross-section, and can be made of a plastically deformable metal such as steel or Aluminum. Flanges at the ends are typically configured with at least two bolt holes such that the ends are securely moment-restrained, forcing all bending to take place within the bar portion or at the corner bends. One example of an angled bar type EA device configured for use in a vehicle seat is disclosed in U.S. Pat. No. 7,938,485 assigned to Armorworks Enterprises LLC, the relevant parts of which are hereby incorporated by reference.

As is the case for all metal deformation EA types, EA member 60 is configured to remain rigid and prevent any deformation or movement from occurring until the applied load exceeds a pre-determined threshold value typically associated with a crash or blast event. In one embodiment for example, a threshold load may be the load imparted to each EA member during the previously discussed 5 g vertical loading condition. Upon exceeding the threshold load, the EA device will begin to plastically (or permanently) deform. Deformation will then continue in a predictable and steady manner until the applied load drops below the threshold value, or until the available space for displacement (also referred to as "stroking length") is gone and the article being supported bottoms out.

Referring still to FIG. 11, EA member 60 is rigidly attached at an upper end to horizontal flange 8 of mounting bracket 7, and at a lower end to the vehicle bed 5, or to an intermediate plate 62 which is in turn fixed to the vehicle bed 5. The attachments at upper and lower ends may be via threaded fasteners, or by more permanent means such as welding. The mounting points at which the brackets 7 and EA members 60 are located may be at the corners of the container as depicted, or at other or additional locations generally around the perimeter, depending upon factors such as the configuration of the container and the anticipated loading environment. In any case the EA members are positioned and distributed so as to hold the container in a rigid and stable manner.

As in previous embodiments, the mounting system may include a rod 13 extending from the vehicle bed through a clear hole 27 in flange 8 of mounting bracket 7. A lower end 14 of the rod is rigidly attached to the vehicle bed, such as by screwing a threaded end of the rod into a threaded hole in intermediate plate 62, or by permanent means such as welding. A nut 65 (or bolt head 65 if rod 13 is a bolt) at an upper end of rod 13 prevents the upper end from passing through the clear hole 27 in flange 8, thereby trapping the flange 8. One or more rods 13 may be employed adjacent each of the EA members 60 as shown, or distributed at intermediate locations about the container.

Prior to the occurrence of a threshold loading event, or in other words under normal circumstances, the container is rigidly supported by the series of EA members 60. Under those circumstances the EA members will not deform despite increases or decreases in the load that may occur during normal operation, such as loads produced by driving a vehicle over rough terrain. However in the case of an under-vehicle upward directed threshold loading event driving the vehicle upward toward the container, the EA members 60 will plastically deform. The container will simultaneously slide downward along rods 13, due to the clearance provided by holes 27, as the space between the vehicle bed 5 and the container decreases. Thus the entire load tending to move the container and vehicle toward one another is carried by the EA members 60, and none of it by the rods 13.

Rods 13 instead serve as guides, and to prevent the container from escaping the vehicle. For example, in a sufficiently severe under-vehicle blast event, the container may bottom out on the vehicle after sliding all the way down on rods 13 and crushing the EA members 60, and then tend to bounce, or rebound. Under such circumstances, if the EA members are broken or otherwise unable to restrain the container, the container may begin to move away from the vehicle. The brackets 7 will slide freely along the rods 13, however this time in an opposite, or upward direction, with the rods providing no resistance until the horizontal flange 8 reaches the nut or bolt head 65. Because nut 65 cannot pass through the hole 27 in flange 8, the upward movement of the flange and container is arrested at that point. Thus, the rods 13 in this embodiment serve as capture devices, or capture bolts, restraining the container only when the EA members are unable to resist an upward load applied to the mounting system by the container.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to clamp the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

What is claimed is:

1. An energy attenuating mounting system configured for attaching a container to a vehicle bed at a plurality of discrete mounting points around the container, the mounting system comprising:
   a bracket attached to the container at each mounting point; and
   a plastically deformable energy attenuating member extending from an upper end attached to the bracket, to a lower end attached to the vehicle bed substantially below a bottom of the container, thereby supporting the container in an elevated position, wherein the energy attenuating member is an elongated metal bar with straight sections intersecting at corner bends, and flanges at the upper and lower ends thereof for securely moment-restraining the upper and lower ends to the bracket and vehicle bed, and wherein the energy attenuating member is configured to remain rigid and un-deformed if a load carried by the energy attenuating member is below a threshold value, and to attenuate energy by plastically deforming in a predictable manner if the load exceeds the threshold value.

2. The energy attenuating mounting system of claim 1, further comprising a rod at each mounting point attached at a lower end thereof to the vehicle bed, and extending upward through a clear hole in the bracket, wherein the bracket is trapped under a nut or bolt head at an upper end of the rod.

3. The energy attenuating mounting system of claim 2, wherein the lower ends of the energy attenuating member and rod are attached to an intermediate plate configured for attachment to the vehicle bed.

* * * * *